CHARACTER RECOGNITION SYSTEMS EMPLOYING AUTOCORRELATION

Filed May 15, 1961 6 Sheets-Sheet 1

INVENTORS
Maxwell Bernard Clowes
John Ronald Parks
BY
Cushman, Darby & Cushman
ATTORNEYS CHARACTER RECOGNITION SYSTEMS EMPLOYING AUTOCORRELATION
Filed May 15, 1961 6 Sheets-Sheet 2
Fig. 5.
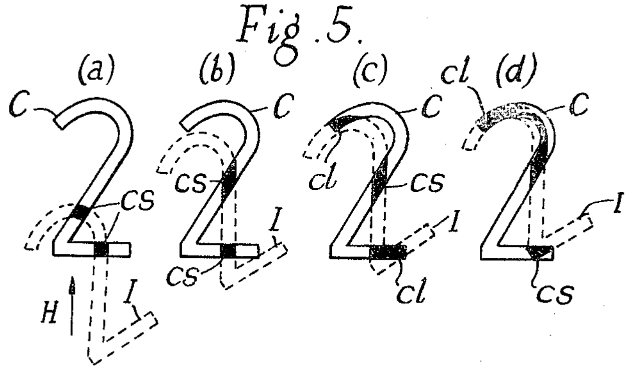
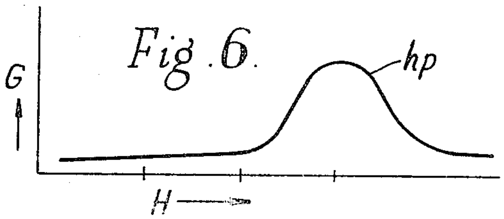
Fig. 6.
Fig. 7.
Fig. 8a.
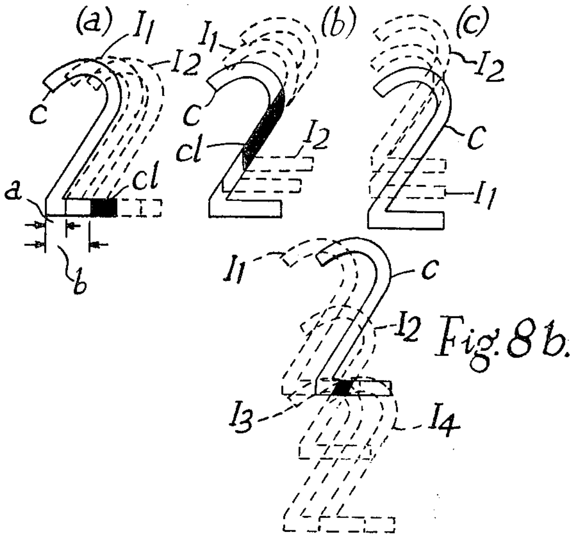
Fig. 7. Fig. 8b.
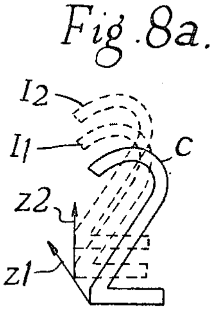
INVENTORS
Maxwell Bernard Clowes
John Ronald Parks
BY
Cushman, Darby & Cushman
ATTORNEYS CHARACTER RECOGNITION SYSTEMS EMPLOYING AUTOCORRELATION
Filed May 15, 1961 6 Sheets-Sheet 3
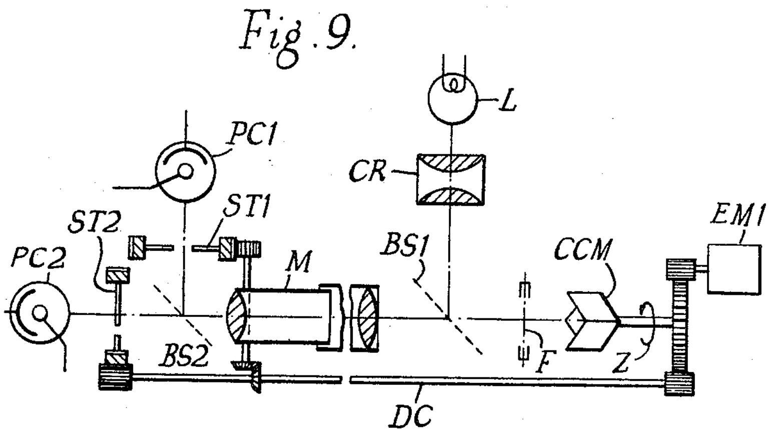
Fig. 10.
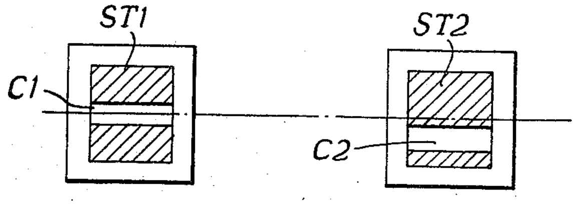
INVENTORS
Maxwell Bernard Clowes
John Ronald Parks
BY
Cushman, Darby & Cushman
ATTORNEYS

CHARACTER RECOGNITION SYSTEMS EMPLOYING AUTOCORRELATION

Filed May 15, 1961 6 Sheets-Sheet 4

INVENTORS
Maxwell Bernard Clowes
John Ronald Parks
BY
Cushman, Darby & Cushman
ATTORNEYS INVENTORS
Maxwell Bernard Clowes
John Ronald Parks
BY
Cushman, Darby & Cushman
ATTORNEYS

CHARACTER RECOGNITION SYSTEMS EMPLOYING AUTOCORRELATION

Filed May 15, 1961 6 Sheets-Sheet 6

INVENTORS
Maxwell Bernard Clowes
John Ronald Parks
BY Cushman, Darby & Cushman
ATTORNEYS United States Patent Office 3,196,395

Patented July 20, 1965

3,196,395

CHARACTER RECOGNITION SYSTEMS EMPLOYING AUTOCORRELATION

Maxwell Bernard Clowes and John Ronald Parks, both of Teddington, England, assignors, by mesne assignments, to International Business Machines Corporation, New York, N.Y., a corporation of New York Filed May 15, 1961, Ser. No. 110,252
Claims priority, application Great Britain, May 20, 1960, 17,992/60; Dec. 21, 1960, 43,923/60
21 Claims. (Cl. 340—146.3)

Figures 1, 2, 3, 4:
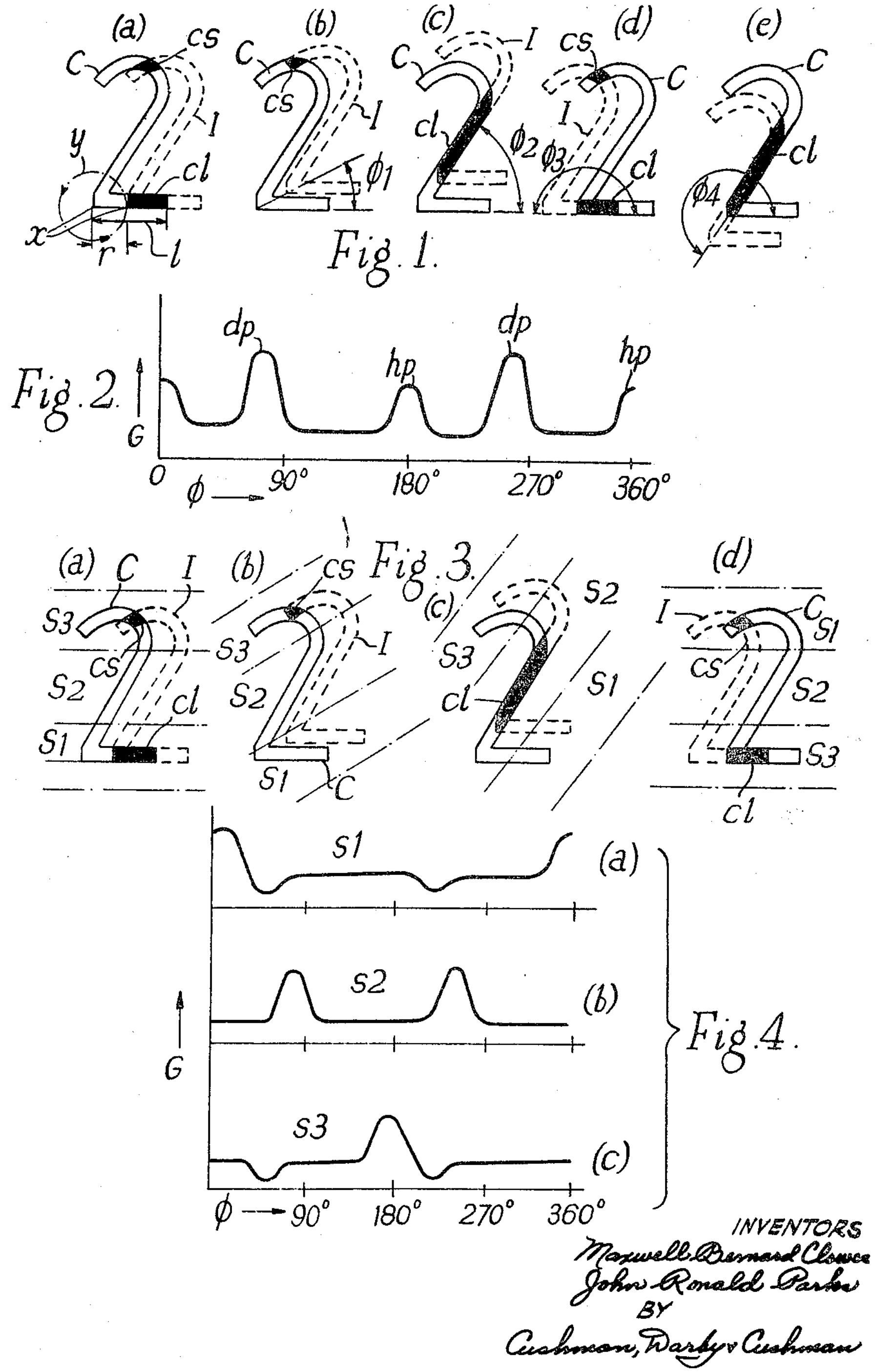

This invention relates to electro-optical systems and apparatus for the recognition of printed or written characters, such as letters and numerals, and has particular, although not exclusive, application in the field of automating operations such as accounting and translating.

Existing systems for recognising printed characters have, in the main, depended upon scanning a character in a particular manner to derive a train of electric pulses and comparing the train of pulses so produced with a number of standard pulse trains to establish identity of the derived pulse train with one of such standard trains. A disadvantage of such known systems is that they are strongly dependent upon the proportions, the position and the orientation of the character to be recognised and many require the use, as a recognisable character, of one which is of standard size, shape and position. Even with the most versatile of the known systems, some normally accepted variations in the shape of the character which is to be recognised can lead to errors of recognition.

One of the objects of the present invention is to provide a novel and improved method of examining characters by means of a scanning operation while another object of the invention is to provide suitable apparatus arrangements for performing the operations necessary to effect recognition of the character using the aforesaid novel and improved method.

The method of recognition according to the present invention comprises the steps of executing a scanning operation over the character to be recognised with an identical image of that character and observing the varying degrees of overlap or agreement between the character and the image in relation to the progress of the scanning cycle. The identical image is a copy of the character and is produced automatically.

Various modes of scanning may be employed. One mode, referred to hereafter as the "nutation" mode, is one in which the image is so displaced and then moved relatively to the character that the locus of every point of the image with reference to the corresponding point of the character during the scanning cycle is a circle of chosen radius. Another possible mode, referred to hereafter as the "rotation" mode, is one in which the image is rotated relatively to the character through a chosen predetermined angle and scanning then effected along a path line of predetermined fixed pattern. Conveniently such path line is a linear one and is arranged so that the centre of area of the image passes through the centre of area of the character.

In a modification according to the invention, instead of scanning the character to be recognised with only one displaced image of itself, scanning is effected simultaneously with a plurality of images each displaced with respect to the character by a different amount and observation then made of the varying degrees of overlap or agreement between the character and all of said images during the scanning cycle. The number of comparison images may be relatively small, such as two, three or four, or it may be indefinitely large, the latter condition being attained in practice by multiple transposition or "smearing-out" of images of the character by suitable optical means.

By suitable choice of the amount of displacement and/or the orientation of the scanning image or images and/or the form of the scanning path or paths employed, advantageous conditions may be established for sensing different component items or features of the various characters included in the group capable of being recognised. Such different features may be, for instance, a downwardly facing concavity at the top of the character such as found at the top of the numeral "2" or "9," or an approximately straight diagonal mid line as found in the numerals "2" and "7," or a horizontal base line as found in the numeral "2" or the block capital letters "L" or "Z," or vertical straight lines as found in the numerals "1" and "4" or in many of the block capital letters, such as "B," "D," "E," "F" and so on. By the use of a number of separate examinations of a given character to be recognised with different forms of scanning movement and/or different relative dispositions of the single or plural scanning image or images, the information made available in signal form may be increased with resultant improvement in the accuracy of recognition of characters having a form widely different from standard form.

In a character recognition system in accordance with the present invention, the varying degrees of overlap or agreement between the character to be recognised and its image or images during the scanning cycle are conveniently measured by photo-electric means to provide an electric waveform which displays minima and maxima corresponding to the differing amounts of overlap during the progress of the scanning cycle and such waveform is then fed to means such as a computer in which it is compared with each of a number of standard waveforms derived respectively from similar scanning and measuring operations upon a number of different known characters, to decide upon the identity of the character under investigation.

In order that the nature of this invention may be more readily understood, a number of method, system and apparatus embodiments thereof will now be described in some detail and by way of illustrative example with reference to the accompanying drawings, in which:

FIG. 1 comprises a number of diagrams (*a*), (*b*), (*c*), (*d*) and (*e*) showing one scanning mode in accordance with the invention at different positions of the scanning cycle;

FIG. 2 is a graphical diagram illustrating the correlate function for the particular scanning method and the particular numeral example illustrated in FIG. 1;

FIG. 3 comprises diagrams (*a*), (*b*), (*c*) and (*d*), corresponding approximately to diagrams (*a*), (*b*), (*c*) and (*d*) of FIG. 1, illustrating a modified method for increasing the information made available during the scanning cycle;

FIG. 4 by diagrams (*a*), (*b*), (*c*) provides a group of correlate functions resembling that of FIG. 2 as provided with the modification shown in FIG. 3.

FIG. 5 by diagrams (*a*), (*b*), (*c*) and (*d*) shows different positions of an alternative scanning mode also in accordance with the invention;

FIG. 6 is a graphical diagram similar to FIG. 2 illustrating the correlate function for the example illustrated in FIG. 5;

FIG. 7 comprises a group of diagrams (*a*), (*b*) and (*c*) illustrating a further modified form of scanning using a plurality of identical images of the examined character;

FIGS. 8*a* and 8*b* are further diagrams illustrating other forms of scanning using a plurality of identical images;

FIGS. 9 to 17 illustrate, in largely schematic form, a number of apparatus arrangements for carrying out the different forms of scanning described in connection with the preceding figures.

Referring now to FIG. 1 of the drawings, this illustrates the aforesaid nutation scan mode. C indicates the character to be identified as numeral "2" and I the identical image thereof with which the scanning operation is performed. The image I is displaced relative to the character C by a distance $r$ and is then moved over a scanning path $y$ such that the locus of any point thereof, for instance the point $x$, relative to the corresponding point of the character C, is a circle. FIG. 1($a$) indicates the first or initial position of the scanning cycle and shows the existence of a major correlate at $cl$ and a single minor correlate at $cs$. FIG. 1($b$) illustrates the conditions arising after displacement of the scanning image I by an angle $\phi_1$ on the 360° scanning cycle. A single minor correlate $cs$ is now the only area of overlap. At angle $\phi_2$, corresponding to the slope of the intermediate diagonal limb of the character, a single major correlate occurs as shown at $cl$ in FIG. 1($c$). During the remainder of the scanning cycle minor correlates continue to occur, more or less without interruption provided the displacement dimension $r$ is not greater than the length $l$ of the straight horizontal portion of the character while another major correlate occurs at the angular position $\phi_3$, 180° displaced from that of FIG. 1($a$) as shown at $cl$ in FIG. 1($d$) and a further major correlate at an angle $\phi_4$, 180° displaced from that of FIG. 1($c$) as shown at $cl$ in FIG. 1($e$).

FIG. 2 illustrates graphically the degree of auto-correlation G against angular displacement $\phi$ during the scanning cycle and demonstrates by the peaks $hp$ the correlates due to the horizontal straight limb of the chosen character, numeral "2," and by the further and larger amplitude peaks $dp$ the correlates due to the inclined or diagonal straight limb of the same character. The diagram of FIG. 2 may be regarded as approximately indicative of the electric signal output of photoelectric sensing means subjected to a light input corresponding with the degree of auto-correlation or overlap between the character and its image during such nutation mode of scanning.

The nutation mode illustrated above clearly has advantages for detecting straight line structure in the character under examination and has been found generally suitable for dealing with Arabic numerals. It will be observed that the maxima/minima pattern of the auto-correlation characteristics is repeated twice during each scanning cycle.

Further increase in the amount of distinctive information provided can be obtained by dividing the field of observation of overlap into two or even more parts. FIG. 3 illustrates one arrangement of this kind as applied to the nutation mode described above with reference to FIGS. 1 and 2. In this modification, observation of the character C and its scanning image I is divided into three parallel strips S1, S2 and S3, S2 passing through the centre of area of the overlapping characters. The orientation of the strips S1, S2 and S3 is arranged always to lie parallel to the direction of displacement of the image I relative to the character C. By means of this sub-division, three sets of overlap maxima or correlate functions are provided as shown, by way of example, in FIG. 4($a$), 4($b$) and 4($c$) which relate respectively to the strips S1, S2 and S3. It will be observed that the correlate diagrams ($a$) and ($c$) for the two outer strips S1 and S3 are similar in form but phase-displaced by 180° so that, in most practical applications, a single outer observation strip is sufficient because the autocorrelation function is inherently symmetric regardless of the observed character. Such separate correlate functions have greater resolution compared with a single equivalent observation area and together provide more, and more definite, information upon which to base recognition.

An alternative scanning mode, a so-called rotation mode, is illustrated by the diagrams ($a$), ($b$), ($c$) and ($d$) of FIG. 5, in which the image I is rotated about its centre through an angle of about 45° and is then moved relatively to the character along a scanning path line H which, in the example shown, is linear and passes approximately through the centre of an area of the character. Successively intermediate positional relationships of the image I to the character C at different positions during the scanning cycle are shown by the respective diagrams ($a$), ($b$), ($c$) and ($d$), from which it is apparent that two minor correlates $cs$ occur in the positions corresponding to diagrams ($a$) and ($b$) but in the position of diagram ($c$) one minor correlate $cs$ is accompanied by two much larger correlates $cl$ due to the substantial coincidence of the two upper hooks of the character chosen for illustration as well as a minor correlate $cs$. With this mode of scanning, maxima of overlap occur when lines having a radius of curvature of approximately the same order of magnitude as the dimension of the character overlap with one another. The related auto-correlate function for the example shown in FIG. 5 is illustrated in FIG. 6, where the large maxima at $hp$ corresponds with the position shown in FIG. 5($d$).

By using different points for initial rotation of the character, e.g. points approximately coincident with the centres of the upper and lower loops of the numeral "8," a wide variety of tests for different features of characters in the alpha-numeric series may be provided. Sub-division of the field of observation as described with reference to FIG. 3 may also be applied to this rotation mode, the subdivision being preferably along lines parallel with the scanning path H.

The above described rotation mode can provide more sets of information per character than the nutation mode, thereby making recognition more certain with characters whose range of variation is very wide. For the recognition of Arabic numerals, the nutation mode will probably provide sufficient information, but for the recognition of letters, particularly hand-written letters and other characters, use of both the nutation and the rotation modes is desirable in order to provide adequate information upon which to base recognition. It will be apparent that other scanning modes may be developed such as movement resembling the rotation type mode but along an elliptical path or a figure-of-eight path.

A further aid to differentiation between different characters is the use of multiple image or copy comparison as shown in FIG. 7 where the character (again the numeral "2") is shown as being scanned with two identical images I1 and I2 each displaced in a common linear direction by distances $a$ and $b$ respectively. The scanning is by the nutational mode already described with reference to FIGS. 1 and 2, whereby the respective images I1 and I2 move around circular paths of different radii. During each cycle there will be clearly defined maximum major correlates by overlap of each of the images with the character at certain angular positions due to the straight inclined central and horizontal base limbs of the character as shown particularly at $cl$ in FIGS. 7($a$) and 7($b$). The number of minor correlates due to coincidence or overlap of each image with the character during the scanning cycle is relatively small.

Such relative displacement of the various images along a linear displacement path is advantageous for providing a series of overlap maxima corresponding to relatively straight line features of the character.

An alternative mode of relative displacement of the plural images adapted to emphasise maxima corresponding to features of the character consisting of arcs of circles is illustrated in FIG. 8$a$ where the first image I1 is displaced in a first direction $z1$ and the second image I2 is displaced in a second direction $z2$.

The number of displaced images or copies may be increased with correspondingly enhanced identification of certain chosen characteristic features of the character under recognition. Three, four, five or more images may be used with accompanying reduction in the number of maxima in the correlation characteristic.

For the purpose of recognising certain restricted types of character style it may be economic and feasible to define each of the (say ten) characters to be discriminated by a unique set of displaced images (say four images and the character) as shown by way of example in FIG. 8*b*.

With such system the character is being recognised by its overall topology or form instead of by identifying its component features separately. Such a system is especially advantageous in cases where the orientation of the character is known but its position is not known.

One apparatus arrangement utilising the nutation scanning mode described above is illustrated in FIG. 9. In this arrangement, the character to be recognised is in the form of a photographic negative, i.e. a clear character-defining region upon a dark or opaque background, such as a film. Such character-bearing element is illustrated at F. A parallel beam of light from a lamp L through a collimator lens system CR is projected through the character-bearing film F by way of a first beam splitter BS1 on to a corner cube mirror CCM which returns the light passing through the character-bearing film F as an identical image upon the film F. Any parts of the character-defining region of such film which are illuminated by such returned image may be observed by means of a magnifier system M by which the film F is imaged upon stop members ST1 and ST2. A further beam splitter BS2 directs a part of the light defining the coincident or auto-correlation regions of such character and image through the first stop member ST1 on to a photocell PC1 while another part of such light passes by the beam splitter BS2 is directed through the second stop member ST2 on to a second photocell PC2. By introducing a slight alignment error into one side of the corner cube mirror CCM, the returned image therefrom may be displaced appropriately with respect to the character by an amount corresponding to the distance *r* in FIG. 1. The corner cube mirror CCM is arranged to be rotatable, as by means of an electric motor EM1, through a suitable drive system so as to execute a nutation scanning cycle as indicated by the arrow Z. The nature of the two stop members ST1 and ST2 is indicated in FIG. 10. The positions of the respective clear zones C1 and C2 are so disposed that the two photocells PC1 and PC2 each see only restricted and different zones of the overlapping character and image corresponding approximately to the central strip S2 and one of the side strips S1 or S3 as already described with reference to FIG. 3. Upon rotation of the corner cube mirror CCM through one revolution, the respective outputs from the two photocells PC1 and PC2 provide two sets of correlate function-representing signals broadly similar in form to the curves shown in FIG. 4(*b*) and FIG. 4(*a*) or FIG. 4(*c*).

Although the use of two or even more photocells is preferred as described above, a single photocell alone may be employed to provide scanning equivalent to the simplest example already described in connection with FIG. 1.

The respective fields of view of the photocells may be caused to scan around the character in synchronism with the nutation of the image to provide a manner of operation as described above with reference to FIG. 3 by rotating the stop members ST1 and ST2 in synchronism with the corner cube mirror CCM, e.g. by suitable drive connections as indicated at DC.

Figure 11:
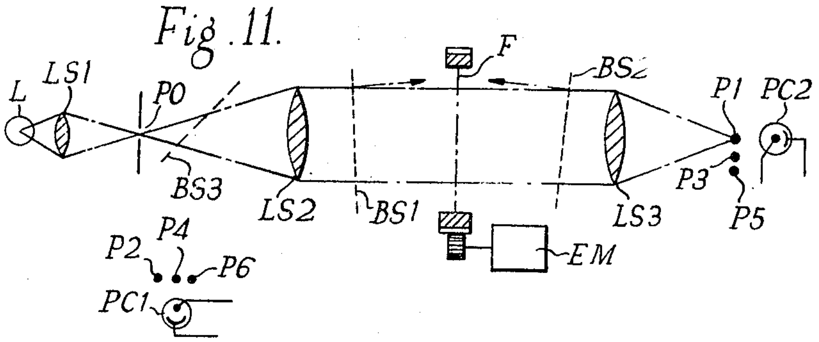

One apparatus arrangement for evaluating the multi-term auto-correlation function using multiple images as described above with reference to FIGS. 7 and 8 is shown in FIG. 11. In this arrangement, a point light source P0 constituted by an aperture of the order of 1 mm. diameter in an opaque screen located in the path of light from a amp L through condensing lens system LS1, illuminates the transparent character of film F through a collimating lens LS2 and a first beam splitter BS1. Light passing through the character forms the first image or character copy and this is, in part, reflected back to the character-bearing film F by way of a second beam splitter BS2. Any light passing through the character from right to left now forms a two-copy auto-correlogram. This, in part, passes through the beam splitter BS1 and with the aid of further beam splitter BS3 is brought to focus at an off-axis position P2. The part of the first image which is not reflected by the beam splitter BS2 can be brought to focus by lens system LS3 at point P1 while that part of the two-copy auto-correlogram which was not transmitted by the beam splitter BS1 to the point P2 is again reflected back on to the character-bearing film F and after passage therethrough forms a three-copy auto-correlogram which may be brought to focus at point P3. In similar manner further four, five or more copy auto-correlograms can be formed and brought to focus at corresponding image positions such as P4, P5 and P6. Light sensitive means such as photocells PC1, PC2 or, more preferably, a photomultiplier tube, placed at any one or more of the positions P2 . . . P6 will register the degree of auto-correlation by the amplitude of the output signal therefrom. Scanning is effected by rotating the character-bearing film F as by means of an electric motor EM.

The relative positioning of the various image copies of the character in the auto-correlogram is controlled by adjusting the position and orientation (about horizontal and vertical axes) of the beam splitters BS1 and BS2. The latter may be half-silvered mirrors, for instance, mirrors having alternate narrow strips completely clear and completely reflecting respectively or the whole surface may be made half reflecting, for instance, by means of a non-metallic coating of dielectric substance which is a half-wavelength thick.

Figure 12:
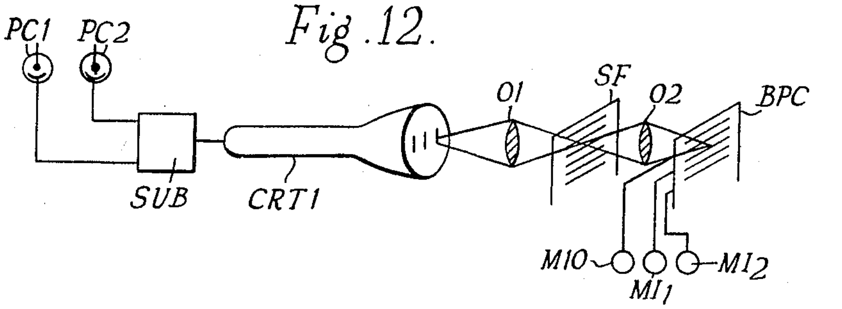

In order to minimise variations in the D.C. level of the auto-correlation function signal, a monitoring photo-electric device (PC1. FIG. 12, described below) located at a suitable point close to P3 or P5, FIG. 11, may be employed to record the scattered light intensity at that position and its output then used as a backing-off voltage against the main output from the chosen position such as P3, P4—as indicated in FIG. 12.

The beam splitters BS1, BS2 may be adjusted to provide image displacement as described above with reference to FIG. 7 or to FIG. 8 in accordance with the desire to detect straight or curved line structure in the character. With the beam splitters so adjusted that each image is only slightly displaced from its predecessor and by arranging for the eventual light pick up to be at the point of focus corresponding to a large number of reflections, the arrangement just described can provide the smearing-out form of operation referred to previously. In an alternative arrangement, instead of rotating the character-bearing film F about the axis of the optical system, the two beam splitting mirrors BS1, BS2 are rotated in unison with one another. In this modification, an auxiliary optical system is also needed to keep the images focussed upon the photocells or like devices at the chosen point or points P2 . . . P6.

The auto-correlation function-representing signal from the device at the chosen point P2 . . . P6, preferably corrected for incidence of scattered light, is fed to a storage device such as a cathode ray storage tube or a magnetic tape or drum store. By means, such as a conventional form of computer, this signal is then compared, e.g. by sampling its amplitude at predetermined points, with a number of similar recorded signals derived from similar operations with standard characters. The standard character signal providing the greatest measure of coincidence is then regarded as indicative of the character under examination.

FIG. 12 illustrates, schematically, one possible arrangement for performing comparison and therefrom effecting recognition of an examined character. In this arrangement the signal output from the monitoring photo-tube PC1, FIG. 12 located at a suitable point close to points P3 or P5, FIG. 11, is combined subtractively in circuit SUB with the signal output from a similar phototube PC2, FIG. 12, which may be located at any chosen one of the focal points P2 . . . P6 and which corresponds to PC1 in FIG. 11. The subtractive effect of the signal from tube PC1 is adjusted so as to back-off or correct the other signal for the incidence of scattered light at the character film F. The resultant signal is then arranged to modulate the beam intensity of a cathode ray tube CRT1. The horizontal or X sweep of the cathode ray tube beam is synchronised with the scanning operation by the motor EM, FIG. 11, while the vertical or Y sweep of the tube beam is arranged to be over a substantial distance and at a relatively high frequency whereby the respective maxima of the auto-correlation function are displayed as a series of vertical lines. This C.R.T. display is imaged by optical means O1 on to a strip of film SF carrying a series of photo records, each of line form, corresponding respectively with the different standard characters from which a recognition selection is to be made. For example, for Arabic numeral recognition, ten separate strips would be provided. By further optical means O2, the light transmitted by each of the film record lines is directed to the related one of a bank of photocells BPC. Each photocell output is indicated by an associated measuring instrument $MI_0$, $MI_1$ . . . the highest output reading denoting the identity of the character.

Figure 13:
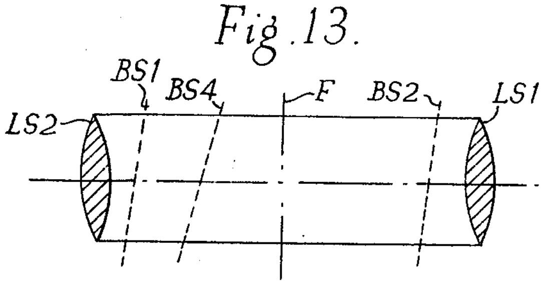

In practice, it may be necessary to measure the degree and form of the auto-correlation function with more than one form of scanning mode and more than one value of image displacement. FIG. 13 illustrates a modification of the arrangement of FIG. 11 in which an additional beam splitter BS4 is provided and is adjustable in its position like the other beam splitter BS1, BS2. By suitable adjustment of position of such beam splitters and choice of location of the pick-up photocells used, the beam splitters BS1 and BS2 may be arranged to co-operate to pick out correlation between straight lines of the examined character while the beam splitters BS2 and BS4 similarly co-operate to pick out correlation between curved lines of such character.

Atlernatively, by appropriate setting of the positions and orientations of the beam splitting mirrors, the three-term auto-correlogram can be used to pick out straight lines while the five-term auto-correlogram simultaneously detects broad curves such as are customarily found in the numerals "6" or "9." This manner of operation can be achieved with the system shown in FIG. 11.

In order to deal with more than one character at a time, a group of arrangements as described in connection with FIG. 11 or FIG. 13 may be disposed side by side, the spacing distance between the optical axes of the arrangements being made equal to the character-spacing distance of the common film strip carrying the character group. In this modification, the respective beam splitters which are common to all of the optical systems are rotated in unison and not the character-bearing film strip. Such multiple character arrangement is conveniently operative upon a microfilm which may be produced automatically from a printed paper record tape such as the till roll of a cash register.

Figure 14:
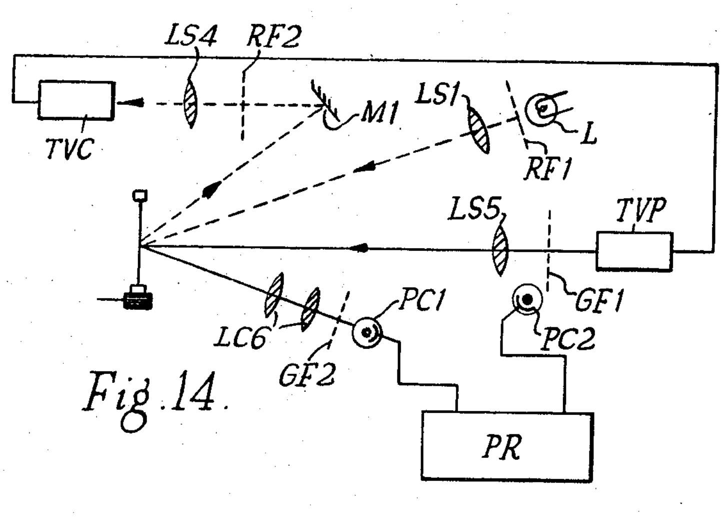

Another apparatus arrangeemnt which does not require the use of transparency for the character under examination is shown in FIG. 14. In this arrangement, the character at F is mounted for rotation and is illuminated by red light from a lamp L through a red filter RF1 and lens system LS1. This illuminated character is viewed by a TV camea TVC by way of mirror M1, red filter RF2 and lens system LS4. The camera output, in addition to application to a monitor, not shown, is fed to a TV projector TVP which, through a green filter GF1 and lens system LS5, projects an identical image in green light upon the character at F. The required displacement of the image relative to the character is obtained by lateral movement of the projector tube. The green light reflection from the character zone is measured by a photo-multiplier tube PC1 through a green filter GF2 and lens system LS6. The photomultiplier tube output is fed to a suitable recorder, e.g. a two-channel pen recorder PR. To allow for correction due to variation of brightness of the image produced on the screen of the projector TVP, the average intensity of the projector tube output is continuously monitored by a second photomultiplier tube PC2 and the tube output utilized to operate a second recording channel of the recorder PR.

An arrangement as last described may be used with either positive or negative form of character, e.g. a black character upon a white background or vice versa, while alternative modes of operation are possible according to whether a positive or a negative image is produced by the TV projector TVP.

Figure 15:
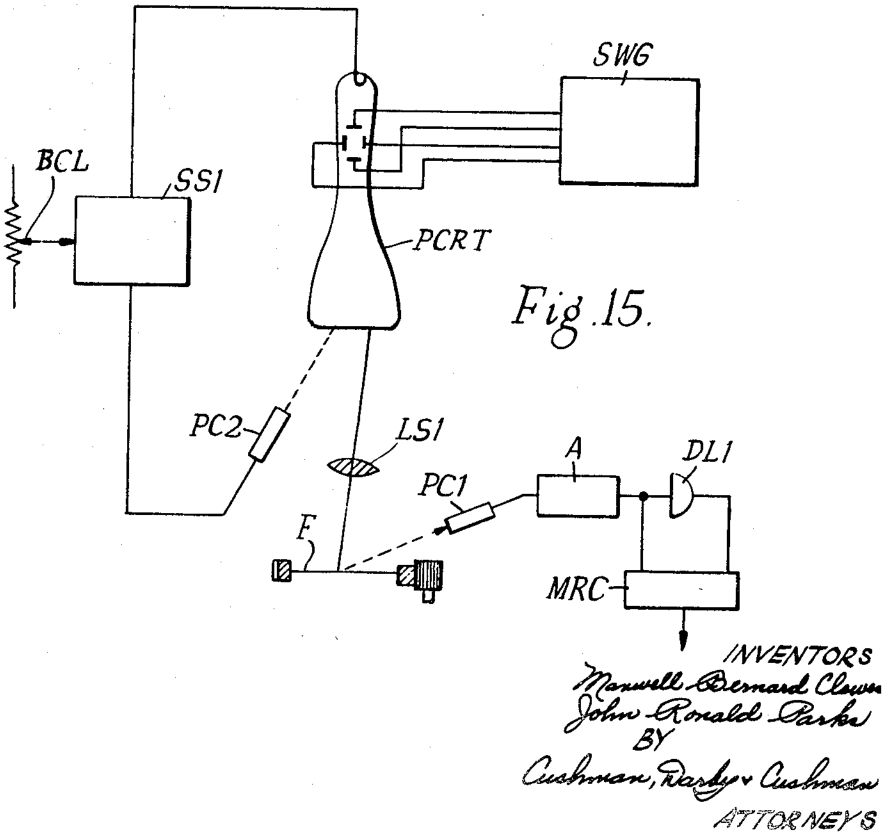

Another arrangement is illustrated in FIG. 15 in which the character under investigation at F is illuminated by the flying spot technique using the raster produced upon the screen of a projection cathode ray tube PCRT under the control of X- and Y-deflection voltages fed to the deflection plates of the tube from the scanning waveform generator SWG. To maintain the spot light intensity sensibly constant, the tube screen is continuously monitored by a photomultiplier tube PC2 whose output operates a servo system SS1 providing a controlled cathode voltage for the tube PCRT conforming to a brightness level set by the manual control BCL.

The produced raster is projected on to the character by means of a lens system LS1 and the resultant light reflected from the illuminated character area is monitored by a further photomultiplier tube PC1 whose output signals represent the shape of the character.

By making the displacement direction *r*, FIG. 1, parallel to the higher frequency line scan direction of the raster produced upon the screen of the tube PCRT, a signal representing the displaced image can be provided merely by delaying the signal from the photomultiplier tube PC1 by an amount equal to the time required by the illuminating light spot to travel that distance along each raster scan line. If these two signals, one representing the character and the other its identical image, are then multiplied, the resultant product signal forms an auto-correlation function signal. As shown in FIG. 15, the output of the photomultiplier tube PC1 is fed by way of amplifier A to one input of a multiplier circuit MRC and by way of a delay circuit DL1 to the second input of such multiplier circuit.

Figure 16:
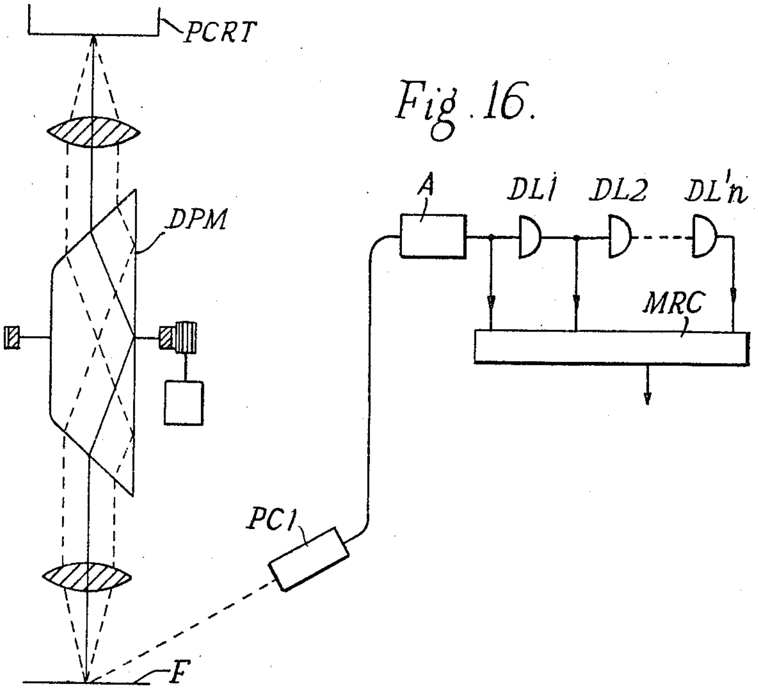

With the arrangements just described, scanning of the image relatively to the character can be effected only by rotating the character F but an alternative arrangement by which the character can be kept stationary is shown in FIG. 16 where a dove prism DPM is disposed within a collimated region of the scanning light path between the projection tube PCRT and the character F and is arranged for rotation by means such as an electric motor EM. In this modification, the effect of an *n* term auto-correlation is obtained by feeding the output of the photomultiplier tube PC1 through a series of delay devices DL1, DL2 . . . DL*n* to provide a sequence of delayed versions of the character representing signal for application to the different inputs of the multiplier circuit MRC.

Figure 17:
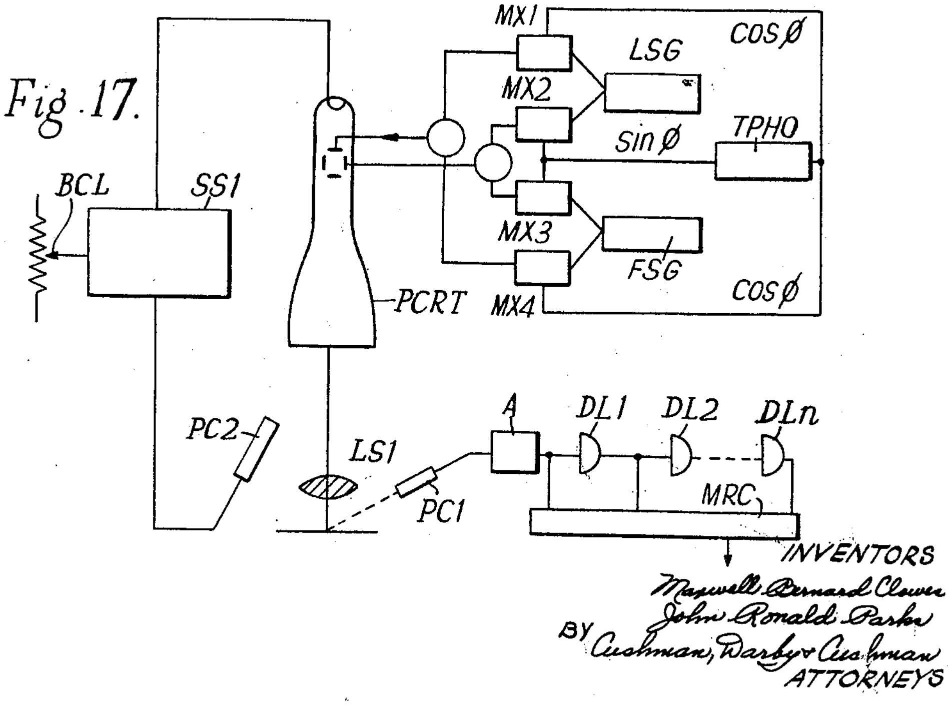

Another alternative arrangement is shown in FIG. 17 in which a rotating raster is provided upon the screen of the projection cathode ray tube PCRT instead of using the rotating dove prism. The normal line and frame scan wave forms from the line and frame scan generators LSG and FSG respectively are modulated in modulators MX1, MX2, MX3 and MX4 by the quadrature outputs from a two-phase low-frequency oscillator TPHO. The modulator outputs are then combined to produce two composite scanning waveforms for application to the deflection plates of the projection tube PCRT.

Numerous modifications, adaptations and other changes may clearly be made without departing from the invention.

We claim:

1. A method of recognising a written or printed character which comprises the step of determining the pattern of the varying degrees of overlap between the character and an optically displaced identical image thereof while the latter is moved relatively to the character over a predetermined scanning path.

2. The method according to claim 1 which comprises the steps of executing a scanning operation over the character to be recognised with said identical image and observing the said varying degrees of overlap between character and image in relation to the scanning cycle.

3. The method according to claim 2 in which the scanning operation comprises the relative movement of the image with respect to the character such that the locus of any point of the image with respect to the corresponding point of the character during the scanning cycle is a circle.

4. The method according to claim 2 in which the scanning operation comprises the initial rotation of the image relatively to the character through a predetermined angle and the subsequent movement of such rotated image relatively to said character along a path line of predetermined and fixed pattern.

5. The method according to claim 4 in which said path line is a linear one with the centre of area of the image passing through the centre of area of the character.

6. The method according to claim 1 which includes the steps of deriving an electric signal whose amplitude varies in accordance with the varying degree of overlap of character and image during the scanning cycle and then comparing such derived signal with each of a series of standard variable signals derived respectively by executing a similar scanning operation over each of a number of different known characters.

7. The method according to claim 1 in which the character to be recognised is scanned simultaneously with a plurality of identical but mutually displaced images of itself and observation made of the extent and positions during the scanning operation at which simultaneous overlap of the character and each of said images exists.

8. An electro-optical system for the recognition of printed or written characters comprising, in combination: means for scanning the character to be recognised with a light beam defining an identical image of the character moving over a predetermined path relative to the character; means for measuring the varying degrees of auto-correlation or overlap between character and image during the scanning cycle by photoelectric means to provide an auto-correlation-representing electric waveform; and means for comparing said waveform with each of a number of standard waveforms derived respectively from similar scanning and measuring operations upon a number of different known characters.

9. A system according to claim 8 wherein said character is defined by a transparency having light transmitting and opaque regions and in which said identical scanning image is obtained by reflecting light passing through said transparency back thereonto after suitable displacement whereby measurement of the amount of returned light again passing through said transparency provides said auto-correlation-representing signal.

10. A system according to claim 9 in which a part of said returned light passing through said transparency is again reflected back on to said transparency after further suitable displacement to provide a second term auto-correlation-representing signal by measurement of the amount of light which again passes through said transparency.

11. A system according to claim 9 in which a part of said returned light passing through said transparency is again reflected back on to said transparency after further suitable displacement and a part of such again-reflected light which again passes through said transparency is yet again reflected back on to said transparency after further displacement to provide a third term auto-correlation-representing signal by measurement of the amount of light passing through said transparency after its further passage through said transparency.

12. An electro-optical system for the recognition of printed or written characters in which a zone including the character to be recognised is repeatedly scanned by a light spot moving over a raster pattern of parallel spaced lines whilst the character is moved over a predetermined path relative to said raster pattern, in which photo-electric means responsive to the variations of light transmitted by said zone during said scanning operations provide an electric signal representing the shape of said character and in which said signal is applied as one input to a multiplying circuit having at least one further input supplied with a time delayed version of said signal to derive an output signal, representing the pattern of the varying degrees of overlap between said character and a displaced identical image when the latter is moved relatively to said character over said predetermined path.

13. A system according to claim 8 in which said predetermined path is one in which the locus of any point of said image with respect to the corresponding point of the character during the scanning movement is a circle.

14. A system according to claim 8 in which said predetermined path is a linear one and in which said image is rotated through a predetermined angle relatively to said character prior to said scanning operation.

15. Electro-optical apparatus for effecting recognition of a written or printed character which comprises means including a light source for providing a collimated light beam incident on one side of a character-bearing transparency, a corner cube mirror system on the opposite side of said transparency for returning light from said beam after passing through said transparency in a direction slightly out of alignment with the axis of said beam and photo-electric means positioned to receive that part of said returned light which has again passed through said transparency.

16. Electro-optical apparatus according to claim 15 in which said corner cube mirror system is rotatable about an axis coincident with the axis of said light beam.

17. Electro-optical apparatus according to claim 15 which includes beam splitting means in the path of said returned light to said photo-electric means and in which a second photo-electric means is arranged to receive a part of said returned light, each of said photo-electric means having associated therewith light stop means for directing different parts of said returned light to each of said photo-electric means.

18. Electro optical apparatus for effecting recognition of a written or printed character which comprises means including a light source for providing a collimated light beam passing through a transparency bearing said character, means for rotating said character within its own plane, first and second beam splitting means disposed within said beam on opposite sides of said character-bearing transparency, each of said beam splitting means being arranged to reflect light which is incident thereon in the direction of said beam in a direction slightly displaced from said beam direction through said transparency, at least one photo-electric device and means for focusing light reflected by one of said beam splitting means on to said photo-electric device after passage through said transparency.

19. Electro-optical apparatus for effecting recognition of a non-transparent written or printed character which comprises means including a light source for illuminating said character with light of a first colour, a TV camera, means including a light filter of said first colour for imaging said illuminated character on said camera, a TV projection device arranged to be energised with video signals from said camera, means including a light filter of a second and different colour for projecting an image in said second colour on said character in displaced relationship thereto, a photo-electric device, means including a light filter of said second colour for focusing light of said second colour at the position of said character on to said photo-electric device and means for rotating said character about an axis normal to the plane thereof.

20. An electro-optical system for the recognition of printed or written characters in which a zone including the character to be recognised is repeatedly scanned by a light spot moving over a raster pattern of parallel spaced lines while the character is moved over a predetermined path relative to said raster pattern, in which photo-electric means responsive to the variations of light transmitted by said zone during said scanning operations provide an electric signal representing the entire shape of said character, in which said signal is applied as one input to a multiplying circuit having at least one further input supplied with a time delayed version of said signal to derive an output signal and means responsive to said output signal and to references, for effecting recognition.

21. A system according to claim 12 in which said predetermined path is one in which the locus of any point of said image with respect to the corresponding point of the character during the scanning movement is a circle.

References Cited by the Examiner

UNITED STATES PATENTS

| | | | |
|---|---|---|---|
| 2,712,415 | 7/55 | Piety | 235—181 |
| 2,753,552 | 7/56 | Hom. | |
| 2,787,188 | 4/57 | Berger | 235—181 |
| 2,839,149 | 6/58 | Piety | 235—181 |
| 2,847,855 | 8/58 | Berger. | |
| 2,884,540 | 4/59 | Shockley. | |
| 2,924,812 | 2/60 | Merritt et al. | 340—146.3 |
| 2,952,075 | 9/60 | Davis. | |
| 2,964,639 | 12/60 | Hobrough. | |
| 2,978,675 | 4/61 | Highleyman | 340—146.3 |
| 2,989,890 | 6/61 | Dressler. | |
| 3,030,021 | 4/62 | Ferre | 235—181 |
| 3,041,011 | 6/62 | Dhanes. | |

MALCOLM A. MORRISON, *Primary Examiner.*

DARYL W. COOK, *Examiner.*